United States Patent Office 3,282,940
Patented Nov. 1, 1966

3,282,940
ANTHRAQUINONYL AMINO TRIAZINE
VAT DYESTUFFS
Kurt Weber, Basel, Paul Hugelshofer, Muttenz, and Albert Riegler and Max Staeuble, Basel, Switzerland, assignors to Ciba Limited, Basel, Switzerland, a company of Switzerland
No Drawing. Filed Dec. 24, 1964, Ser. No. 421,098
Claims priority, application Switzerland, Sept. 8, 1961, 10,467/61; Feb. 1, 1962, 1,307/62; Mar. 19, 1962, 3,232/62; Aug. 3, 1962, 9,300/62
2 Claims. (Cl. 260—249)

This is a continuation in part of our application Serial No. 221,457, filed September 5, 1962, now abandoned.

The conventional vat dyestuffs are water insoluble dyes which may be more or less easily reduced to a water-soluble leuco form and subsequently reoxidized on the fiber where the original insoluble chromophore is formed again.

There are already known vat dyestuffs that contain cleavable sulfo groups, i.e. groups which are eliminated during the dyeing process so that in this case too the insoluble chromophore is formed on the fiber. Vat dyestuffs with stable sulfonic acid groups are also known but these water-solubilizing groups are always associated with a group which increases the affinity of the dyestuff for cellulose i.e. for instance an azo and/or a carbamide group or a fiber-reactive group which chemically fixes the dyestuff on the cellulose fiber and prevents it from being soaped off or washed away from the fiber. The other known vat dyestuffs containing sulfonic acid groups yield either no dyeing or only very unfast dyeings which do not attain the standards for vat dyeings.

It has now been found that there is surprizingly one group of water-soluble vat dyestuffs which contain stable sulfonic acid groups and in spite of this fact yield fast dyeings notwithstanding the circumstance that they are devoid of affinity increasing azo linkages and of carbamide groups and of fiber-reactive groups.

The present invention thus provides new anthraquinone vat dyestuffs that contain at least one sulfonic acid group and/or carboxyl group, but that are free from carboxylic acid amide groups and that contain at least one triazine ring, all three carbon atoms of which carry an arylamino group, of which at least one and at most two are derived from a vattable amine and the third is an arylamino group having 2 to 4 six-membered carbocyclic rings. There can be several triazine rings of the kind defined in the vat dyestuffs of the invention.

The term "anthraquinone vat dyestuffs" includes dyestuffs of the anthraquinone series that are capable of conversion by reduction into a so-called leuco form or vat, which has a better affinity for natural and regenerated cellulose fibers than has the non-reduced form, and which can be reconverted by oxidation into the original chromophoric system. As vat dyestuffs of the anthraquinone series there are to be understood not only derivatives with simple 9:10-dioxoanthracene rings, but also derivatives with thiophanthrone radicals and the like, and also triazine derivatives that contain 9:10-dioxoanthracene rings and that contain other fused carbocyclic and heterocyclic rings, especially those that contain two or more anthraquinone units.

As examples of anthraquinone radicals that are bound to the triazine nucleus through an amino group, especially through an NH bridge, there may be mentioned the following:

Anthrapyrimidines,
anthrapyridones,
isothiazole-anthrones,
quinazoline-anthraquinones,
oxazole-anthraquinones,
thiazole-anthraquinones,
oxidiazole-anthraquinones,
anthraquinonyl-triazoles,
pyrazole-anthraquinones,
dipyrazoleanthronyls,
pyrazinoanthraquinones,
azabenzanthrones,
anthraquinone-acridones,
indanthrones,
thioxanthrone-anthraquinones,
anthrimides,
anthrimide-carbazoles,
dihydroacridines,
anthanthrones,
pyranthrones,
dibenzpyrenequinones,
dibenzanthrones,
isodibenzanthrones,
flavanthrones,
acedianthrones,
phthaloyl compounds of 2- and polynuclear hydrocarbons.

In addition to at least one sulfonic acid group and/or carboxylic acid group the dyestuffs can also contain substituents that are usual in vat dyestuffs, such as halogen atoms, alkoxy groups, alkyl groups, sulfonic acid amide groups, sulfone groups and the like, and also reactive substituents but no carboxylic acid amide groups, that is to say, no acylamino groups and no halogenated pyrimidine and triazine radicals. As sulfonic acid groups there are to be understood stable sulfonic acid groups that are not split-off in the vat. Of special interest are the vat dyestuffs of the kind defined that contain sulfonic acid groups as the only substituents containing sulfur.

The most valuable dyestuffs of the present invention correspond in their free acid state to the formula

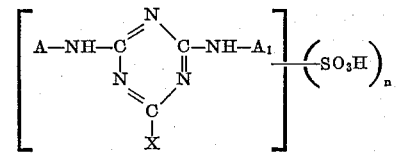

wherein A and $A_1$ each is anthraquinonyl (i.e. α- or β-anthraquinonyl, chloroanthraquinonyl, methoxyanthraquinonyl or methylanthraquinonyl) and X is an arylamino group bound by its nitrogen atom and having 2 to 4 six-membered carbocyclic rings (for example the diphenylamino i.e. o-, m- or p-phenylanilino or the N-phenylanilino-, the α- or β-naphthylamino-chrysenyl or pyrenylamino groups), $n$ being 1 to 2.

The new vat dyestuffs are obtained when (a) an anthraquinone vat dyestuff that is free from carbamide groups and that contains at least one triazine ring, all three carbon atoms of which carry an arylamino group, of which at least one and at most two are derived from a vattable amine and the third is an arylamino group having 2 to 4 six-membered carbocyclic rings, is treated with a sulfonating agent until at least one —$SO_3H$ group is introduced, or (b) a vat dyestuff that is free from carbamide groups and that contains at least one grouping that can be hydrolyzed into a carboxylic acid or sulfonic acid group, especially a sulfonic acid halide group, and at least one triazine ring, all three carbon atoms of which carry an arylamino group, of which at least one and at most two are derived from a vattable amine and the third is an arylamino group having 2 to 4 six-membered carbocyclic rings, is subjected to hydrolysis, or (c) two amino anthraquinones free from carbamide groups that contain each an acylatable amino group are linked together through a dihalogenated sulfoarylamino-1,3,5-triazine of which the arylamino group bears a sulfoaryl group having 2 to 4 six-membered carbocyclic rings, or (d) a 2-halogeno-4:6-dianthraquinonyl amino 1:3:5-triazine free from carbamide groups is condensed with a primary or secondary aryl amine that contains carboxylic acid groups and/or sulfonic acid groups on an aryl group having 2 to 4 six-membered carbocyclic rings until the halogen atom is replaced by an amino group.

As starting materials for method (a) of the present process there may be used vat dyestuffs that are free from acylamino groups and that contain at least one triazine ring, all three carbon atoms of which carry an arylamino group, of which at least one and at most two are derived from a vattable amine and the third is derived from an arylamine having 2 to 4 six-membered carbocyclic rings. As such vat dyestuffs there may be mentioned more especially those which contain a bicyclic or a tetracyclic arylamino - substituted 1:3:5 - triazine bridge between two anthraquinone nuclei. As examples of such starting materials there may be mentioned, for example, compounds of the formula

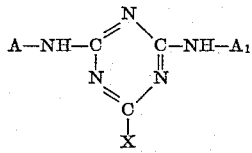

wherein A and $A_1$ each is anthraquinonyl (i.e. α- or β-anthraquinonyl, chloroanthraquinonyl, methoxyanthraquinonyl or methylanthraquinonyl) and X is an arylamino group bound by its nitrogen atom and having 2 to 4 six-membered carbocyclic rings (for example the diphenylamino i.e. o-, m- or p-phenylanilino or the N-phenylanilino-, the α- or β-naphthylamino-chrysenyl or pyrenylamino groups).

The sulfonation of vat dyestuffs of the kind defined can be carried out by methods in themselves known, for example, by heating with oleum or in sulfuric acid. By a treatment with chlorosulfonic acid there are obtained sulfonic acid chlorides that, in accordance with method (b) of the present process, can be converted into the vat dyestuffs of the invention by hydrolysis, for example, with alkali metal hydroxides or alkali metal carbonates in aqueous medium.

As starting materials for method (c) of the present process there may be used aminoanthraquinones and anthraquinone vat dyestuffs that do not contain a carbamide group, but that may already contain the sulfonic acid group and/or carboxyl group characteristic of the dyestffs of the invention, and also an amino group that contains a reactive hydrogen atom.

The condensation with halogenated triazines that may contain sulfonic acid groups, especially di- and tri-chloro-1:3:5-triazines, such as a compound of the formulae

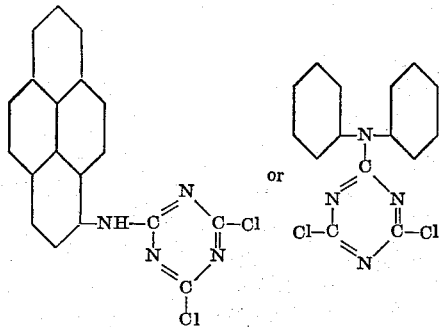

or corresponding derivatives that contain carboxylic acid groups and/or sulfonic acid groups should naturally be carried out under conditions that do not bring about elimination of the sulfonic acid groups present in the starting materials or, if there are no sulfonic acid groups present in the starting materials, under conditions that provide for the subsequent introduction of at least one such group, for example, by means of concentrated sulfuric acid or oleum.

If the vat dyestuffs that are free from carbamide already contain in the triazine ring an exchangeable chlorine or bromine atom, this can be condensed by reaction with an amine that contains a sulfonic acid group and/or carboxyl group, for example, an aminonaphthalene sulfonic acid.

The dyestuffs obtained by the process of the present invention are new. Of most interest are those that contain at least two anthraquinone units comprising at most 4 fused rings, or at least one polycyclic radical with at least 5 fused rings. They are suitable for dyeing a very wide variety of materials, and especially textile materials of natural or regenerated cellulose by the usual vat dyeing or printing methods. The dyeings and prints so obtained are distinguished by their excellent fastness to light and excellent properties of wet fastness such as to soaping, washing, or soda boiling and they do not lose much of their strength during the soaping step of the vat dyeing processes.

The dyeings produced with the dyestuffs of the invention that contain at least two anthraquinone units are also fast to dry cleaning and migration. The dyed fabrics can therefore be coated with synthetic resins, for example, polyvinyl chloride, without the dyestuff migrating into the resin, which is particularly important in the manufacture of artifical leather.

As compared with the conventional vat dyestuffs, the vat dyestuffs of the invention possess a better levelling and penetrating power. When used for dyeing in circulating liquor machines they do not give rise to faulty dyeings caused by the precipitation of re-oxidized dyestuff when foam is formed, and the pigmenting operation that is necessary in dyeing wrapped packages, for example, cheeses, or in dyeing tricots on a winch machine, with the conventional vat dyestuffs is superfluous with the dyestuffs of the invention. Moreover, they can be used in the form of solutions in fast-running pad-dyeing processes and do not have to be in the form of finely dispersed commercial preparations or in the form of special pastes, so that the disadvantages associated with such forms (instability of the paste, dusting and the need for one or more operations to prepare finely dispersed powders) do not arise. Finally, they can generally be vatted very easily, often at room temperature and, if desired, with mild reducing agents. They possess a very good solubility in the vat and yield, especially on regenerated cellulose, strong and very level dyeings that usually exhibit the same shades as the corresponding dyeings on cotton.

The following examples illustrate the invention: unless otherwise stated, the parts and percentages are by weight, and the relationship of parts by weight to parts by volume is the same as that of the gram to the milliliter.

*Example 1*

4 parts of the dyestuff of the formula

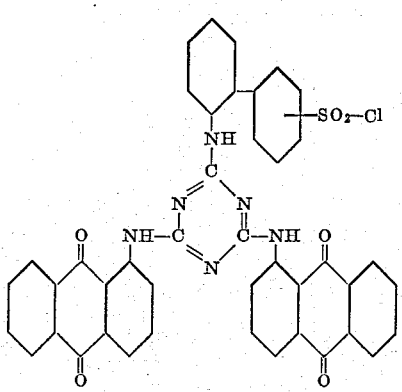

are suspended in a finely divided form in 300 parts of water and then 16 parts by volume of sodium hydroxide solution of 30% strength and 8 parts of sodium dithionite are added at 50 to 60° C., while stirring. The resulting vat is kept at 50 to 60° for one hour. Air is then introduced for one hour, and the product that precipitates thereby is filtered off and dried in vacuo.

The new dyestuff so obtained corresponds, in the form of the free acid, to the formula

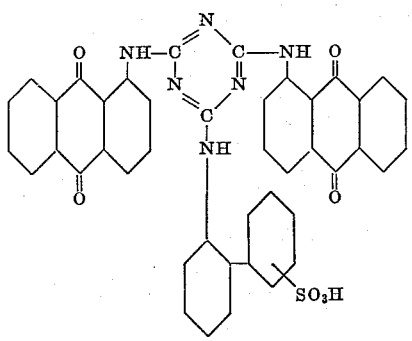

and, when applied by the dyeing method given below, yields yellow dyeings possessing good properties of fastness.

*Dyeing prescription.*—2 parts of dyestuff are suspended in 500 parts of water at 60° C. The suspended dyestuff is vatted in a dyebath that contains 20 parts of sodium hydroxide solution of 30% strength and 12 parts of sodium hydrosulfite in 3500 parts of water. 100 parts of well-wetted cotton are entered into the dyebath at 50° C. and dyed therein for 45 minutes at 50° C. After dyeing has been in progress for 10 minutes, 60 parts of sodium chloride are added and then, after 20 minutes, a further 60 parts of sodium chloride are added. The cotton is then removed from the dyebath, oxidized, neutralized, thoroughly soaped at the boil, rinsed in warm water and then in cold water, and dried.

*Example 2*

6.9 parts of the dyestuff of the formula

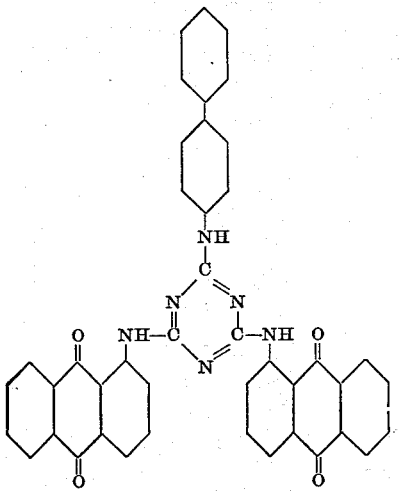

are introduced into 190 parts of oleum having an $SO_3$ content of 2% and the whole is stirred for 20 hours at room temperature. The solution is then poured on to about 1000 parts of ice and the product that precipitates thereby is isolated by filtration, suspended in about 1000 parts of water at 70 to 80° C., and the suspension is then neutralized with sodium hydroxide solution. After the addition of 50 parts of sodium chloride, the product is isolated by filtration and dried in vacuo.

The new water-soluble vat dyestuff so obtained which, in the form of the free acid, corresponds to the formula

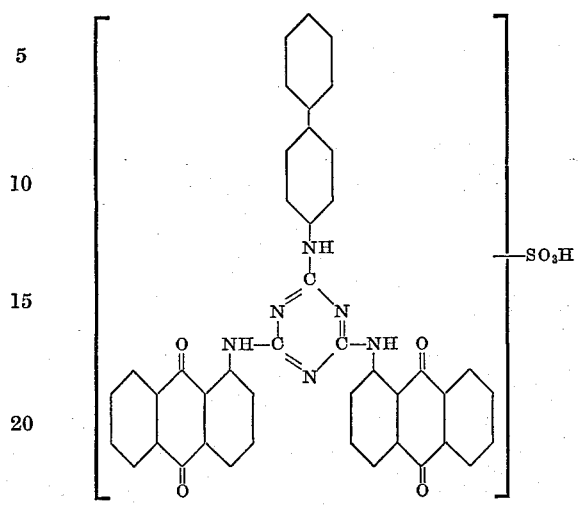

yields strong, golden yellow dyeings possessing excellent properties of fastness when applied according to the dyeing prescription given in Example 1.

If, in this example, there is used the dyestuff of the formula

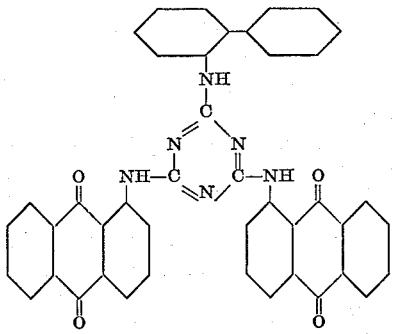

instead of the first-mentioned compound, and stirring is carried out for 2 hours at room temperature, there is obtained a water-soluble dyestuff that is a mixture of a monosulfonic acid and a disulfonic acid and that yields dyeings possessing good fastness to washing when applied according to the dyeing prescription given in Example 1.

*Example 3*

5 parts of the cyanuration product of the formula

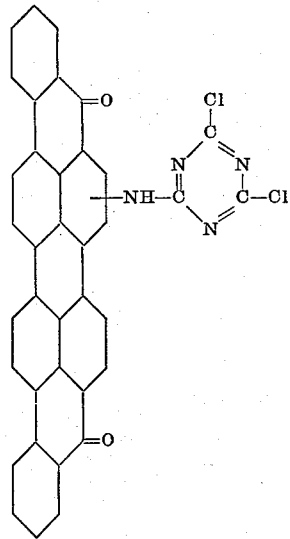

are suspended in 100 parts of dry nitrobenzene and heated to 160° C. To this suspension is added a solution of 13.5 parts of para-aminodiphenyl in 50 parts of nitrobenzene and condensation is carried out for 6 hours at 180 to 190° C. in the presence of 0.2 part of pyridine, while stirring. After cooling the reaction mixture to room temperature, the dyestuff is isolated by filtration, washed successively with nitrobenzene, alcohol and water, and then dried in vacuo at 70° C.

5.7 parts of the condensation product so obtained are introduced in small portions into 100 parts of oleum having an SO$_3$ content of 1% at room temperature and the whole is stirred for 3 hours. The sulfonation mixture is then poured on to ice and the dyestuff suspension is filtered off. The filter residue is then thoroughly washed with water and then introduced into a solution of 10 parts by volume of sodium hydroxide solution of 30% strength and 8 parts of sodium hydrosulfite in 500 parts of water, and the whole is stirred at 40 to 45° C. until a vat solution is formed. The dyestuff is then re-oxidized by blowing in air and is then isolated by filtration. The moist filter cake is pasted with 5.7 parts of sodium dinaphthylmethane disulfonate and evaporated in vacuo to dryness at 80° C.

The water-soluble dyestuff so obtained is a mixture of a monosulfonic acid and a disulfonic acid of the dyestuff of the formula.

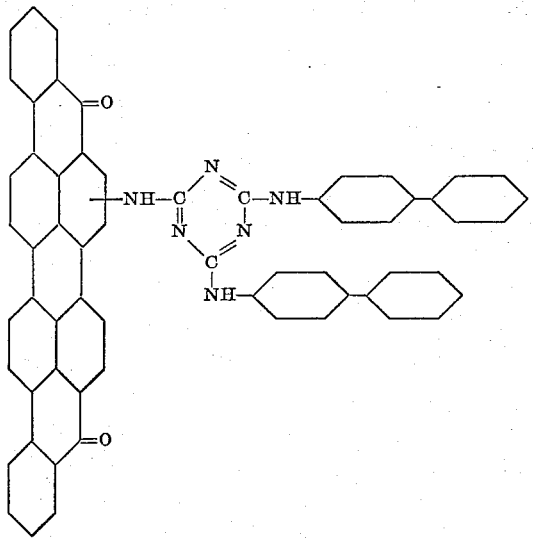

and dyes cotton and regenerated cellulose greenish grey to black tints possessing excellent properties of fastness from an alkaline hydrosulfite vat.

*Example 4*

21 parts of 1-aminoanthraquinone and 15 parts of 2,4-dichloro-6-diphenylamino-triazine-1,3,5 are stirred in 300 parts by volume of nitrobenzene in the presence of 0.1 part by volume of pyridine for 3 hours at 140–145° C.

and for another hour at 180–185° C. After cooling, the precipitate is filtered off and the filter cake is thoroughly washed with methanol, and dried at 80° C. under reduced pressure.

10 parts of the dyestuff so obtained are introduced at room temperature into 100 parts by volume of oleum containing 10% of free SO$_3$. After 30 minutes, the batch is poured onto ice, and the precipitate filtered off. The filter cake is washed with dilute sodium chloride solution until the filtrate shows a neutral reaction. The dyestuff obtained on drying has the formula

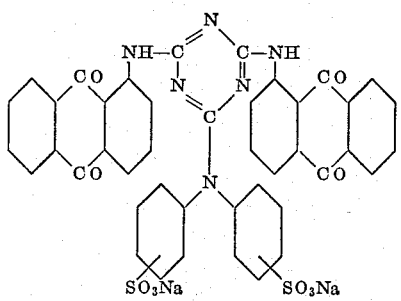

It dyes cotton by the vat dyeing method yellow tints.

A similar dyestuff is obtained when the same quantity of 2-aminoanthraquinone is used instead of 1-aminoanthraquinone. It dyes cotton greenish yellow tints by the vat dyeing method.

When corresponding quantities of 3-chloro-1-aminoanthraquinone or 4-methoxy-1-aminoanthraquinone are used, similar dyestuffs are obtained which dye cotton, by the vat dyeing method, red or yellow tints, respectively.

*Example 5*

4.21 parts of mono-aminoacedianthrone are ground for 12 hours in a ball mill in 120 parts by volume of dry nitrobenzene, and the resulting paste is rinsed into a reaction vessel with 100 parts by volume of anhydrous nitrobenzene. After the addition of 0.2 part of anhydrous pyridine and 3 parts of cyanuric chloride, dissolved in 30 parts by volume of dry nitrobenzene, the whole is heated to 170 to 180° C. and stirred at that temperature for 30 hours. After cooling the reaction mixture, the cyanuration product is isolated by filtration, washed with dry nitrobenzene, and again suspended in 100 parts by volume of dry nitrobenzene. To this suspension are then added 0.2 part of anhydrous pyridine and 13.5 parts of 4-aminodiphenyl dissolved in 50 parts by volume of dry nitrobenzene and the whole is stirred for 7 hours at 180 to 190° C. After cooling the reaction mixture, the precipitated dyestuff is isolated by suction filtration, washed successively with nitrobenzene, alcohol and water, and then dried in vacuo at 60° C. The product so obtained is sulfonated for 5 hours at 40–50° C. in sulfuric acid having a free SO$_3$ content of 4% and then worked up in the usual manner.

The dyestuff, in the form of the sodium salt, corresponds to the formula

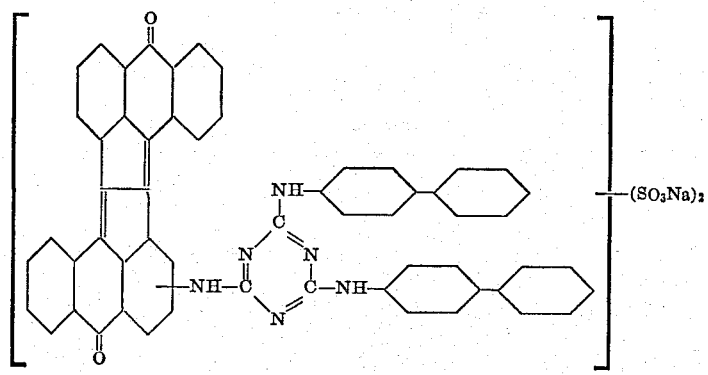

It is readily soluble in water and dyes cotton and regenerated cellulose very fast brown tints from a vat.

Example 6

8.42 parts of mono-aminoacedianthrone in 200 parts by volume of dry nitrobenzene are finely ground in a ball mill, the mixture is rinsed into a reaction vessel with 200 parts by volume of dry nitrobenzene, 1 part by volume of anhydrous pyridine is added and the whole is heated to 170 to 180° C. while stirring. A solution of 1.94 parts of cyanuric chloride in 15 parts by volume of dry nitrobenzene is then added dropwise and the whole is stirred for 24 hours at 170 to 180° C. The dicondensation product so obtained is isolated by filtration when the reaction mixture has cooled and washed with dry nitrobenzene.

5 parts of the cyanuration product so obtained are suspended in 100 parts by volume of anhydrous nitrobenzene, 3 parts of aminodiphenyl are added, and the whole is stirred for 6 hours at 180 to 190° C. After cooling the reaction mixture, the dyestuff so obtained is isolated by suction filtration, washed with nitrobenzene, alcohol and water, and then dried in vacuo at 60° C.

The sulfonation of the dyestuff is carried out in the following manner: 1.5 parts of the dyestuff are introduced, at room temperature, into 30 parts of sulfuric acid that contains 4% of free $SO_3$ and the whole is stirred for 5 hours at room temperature. The reaction mixture is then cautiously poured into 450 parts of ice water, and the dyestuff that precipitates thereby is isolated by filtration and then washed free from mineral acid with cold water. The dyestuff is then suspended in 500 parts of water, the suspension is heated to 70 to 80° C., and rendered alkaline with sodium hydroxide solution of 30% strength. After stirring for half an hour at 70° to 80° C., sufficient sodium chloride is added to precipitate the dyestuff. The precipitate is isolated by filtration, washed with a dilute solution of sodium chloride, and then dried in vacuo at 60° C.

The water-soluble dyestuff so obtained that corresponds to the formula

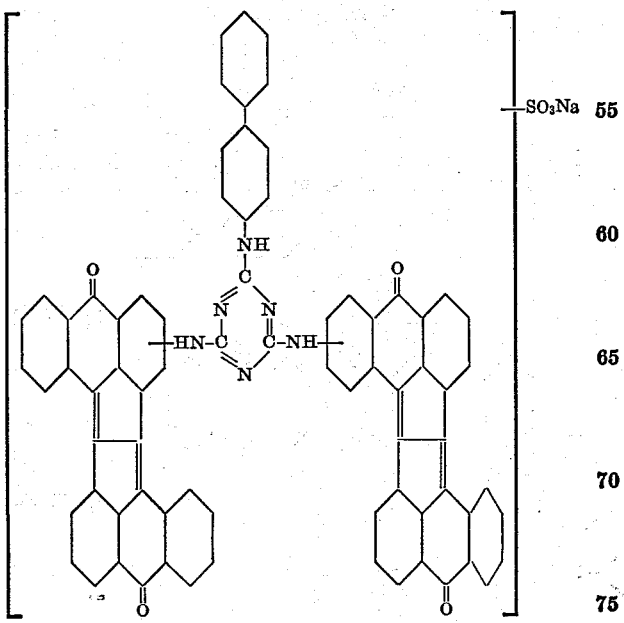

dyes cotton and regenerated cellulose rich brown tints possessing excellent properties of fastness.

Example 7

3.47 parts of aminodibenzpyrenequinone are stirred for 30 hours at 170–180° C. in 120 parts of anhydrous nitrobenzene with 3 parts of cyanuric chloride in the presence of 0.2 part of pyridine. After cooling the reaction mixture, the reaction product is isolated by filtration.

5 parts of the cyanuration product so obtained are suspended in 100 parts of anhydrous nitrobenzene, 0.2 part of anhydrous pyridine and 13.5 parts of 4-aminodiphenyl are added and the whole is stirred for 6 hours at 180 to 190° C. After cooling the reaction mixture, the dyestuff is isolated by filtration, washed with nitrobenzene, alcohol and water, and then dried in vacuo at 60° C. The product is sulfonated for 5 hours at 30° C. in oleum of 4% strength and is worked up in the usual manner into the sodium salt of the sulfonic acid.

The dyestuff so obtained which corresponds to the formula

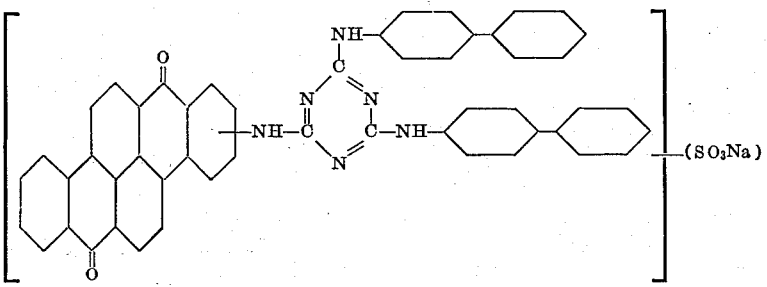

is water-soluble and dyes cotton and regenerated cellulose yellow-brown tints possessing good properties of fastness.

Example 8

27.2 parts of 2-amino-3:4-phthaloyl-acridone, 7.4 parts of cyanuric chloride and 0.1 part of dimethylformamide are heated for 2 hours at 135–140° C. in 300 parts of dry nitrobenzene while stirring well, and then for 1 hour at 170 to 175° C. After cooling the reaction mixture, the blue crystals are isolated by filtration, washed with nitrobenzene and benzene, and then dried.

28.6 parts of the product so obtained, 11.5 parts of α-naphthyl-amine and 0.1 part of dimethylformamide are heated for 4 hours at 195 to 200° C. in 300 parts of dry nitrobenzene while stirring well. At 100° C., the crystals that precipitate thereby are isolated by filtration, washed with nitrobenzene and alcohol, and then dried. 5 parts of the dyestuff so obtained which corresponds to the formula

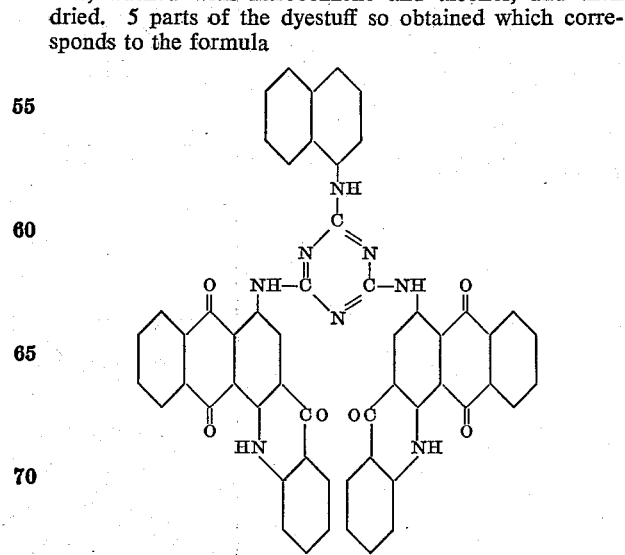

are introduced in small portions, at room temperature, into 150 parts of oleum having an $SO_3$ content of 1% and the whole is stirred for 3 hours. The reaction mixture is then poured on to ice and the dyestuff is isolated by filtration. The filter residue is washed with water, suspended in about 1000 parts of water at 50 to 60° C., and the suspension is then neutralized with a dilute solution of sodium hydroxide. After the addition of 30 parts of sodium chloride, the dyestuff is isolated by filtration, and then dried in vacuo at 80° C.

The dyestuff so obtained of the formula

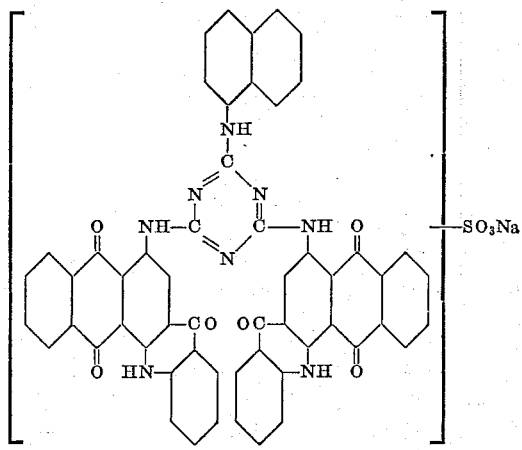

dyes cotton and regenerated cellulose very fast greenish blue tints from an alkaline hydrosulfite vat.

*Example 9*

5.15 parts of 1-amino-5-chloroanthraquinone are dissolved in 100 parts of dry nitrobenzene at 140° C. while stirring. 1.9 parts of cyanuric chloride and 0.1 part of pyridine are added to the solution so obtained, condensation is carried out for 4 hours at 140 to 150° C. and, after cooling the reaction mixture, the dyestuff intermediate product of the formula

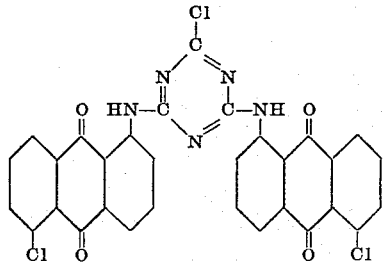

so obtained is isolated by filtration and then dried in vacuo at 70° C.

4.8 parts of the monochlorotriazine derivative so obtained are reacted with 5.0 parts of 3-aminopyrene in 100 parts of dry nitrobenzene for 6 hours at 140 to 145° C. while stirring well and, after cooling the reaction mixture, the condensation product is isolated by filtration, washed with methanol and water, and then dried.

5 parts of the condensation product so obtained of the formula

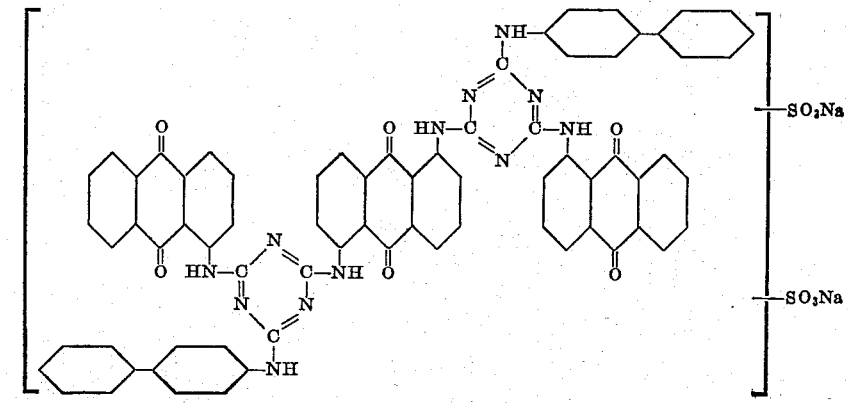

are sulfonated and isolated as described in Example 8.

The dyestuff so obtained dyes cotton and regenerated cellulose fast yellow tints from a hydrosulfite vat.

Instead of the 5-chloro-1-aminoanthraquinone given above, there can be used with equal success equivalent amounts of 4-methoxy-1-aminoanthraquinone,
6-methyl-1-aminoanthraquinone,
1-aminoanthraquinone-6-sulfonic acid dimethylamide or
1-aminoanthraquinone-6-methylsulfone.

*Example 10*

5.4 parts of the condensation product of 1:5-diaminoanthraquinone and cyanuric chloride having the formula

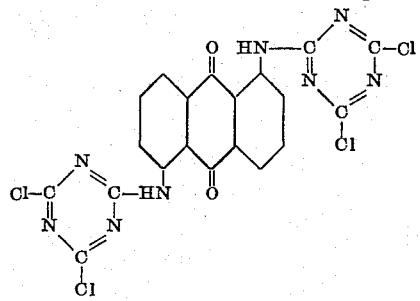

are stirred for 4 hours at 140 to 145° C. with 4.5 parts of 1-aminoanthraquinone in 100 parts of dry nitrobenzene in the presence of 0.1 part of pyridine, and then for 4 hours at 170 to 175° C. After cooling the reaction mixture, the orange-red dyestuff suspension is filtered, and the dyestuff is heated for 4 hours at 140° C. and then for 4 hours at 175° C. with 7.5 parts of 4-aminodiphenyl and 0.2 part of pyridine in 100 parts of nitrobenzene, while stirring. The reaction mixture is then cooled to room temperature, the dyestuff is isolated by filtration, washed with acetone, and then dried in vacuo at 80° C.

5 parts of the dyestuff so obtained are sulfonated and isolated as described in Example 9. There is obtained in this manner a water-soluble dyestuff of the formula

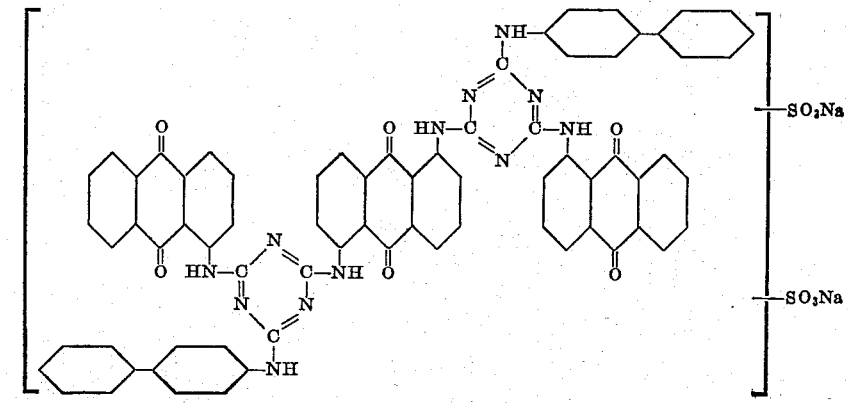

which dyes cotton and regenerated cellulose yellow-brown tints possessing excellent properties of fastness from a hydrosulfite vat.

What is claimed is:
1. The vat dyestuff of the formula

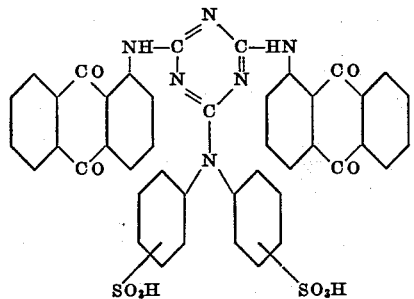

2. A vat dyestuff of the formula

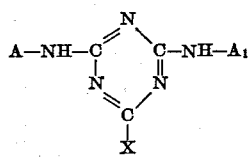

in which X is pyrenylamino and A and $A_1$ each represents an anthraquinonyl radical.

References Cited by the Examiner

UNITED STATES PATENTS

| 2,742,466 | 4/1956 | Randall et al. | 260—249.6 |
| 2,978,289 | 4/1961 | Barker et al. | 260—249 |

OTHER REFERENCES

"The Chemistry of Synthetic Dyes and Pigments," Ed. H. A. Lubs, A.C.S. Monograph Series, No. 127, Reinhold Pub. Corp., New York, (1955) p. 353.

WALTER A. MODANCE, *Primary Examiner.*

JOHN M. FORD, *Assistant Examiner.*